US012415252B2

(12) United States Patent
Lindalu

(10) Patent No.: US 12,415,252 B2
(45) Date of Patent: Sep. 16, 2025

(54) ASSEMBLY JIG

(71) Applicant: ICEYE OY, Espoo (FI)

(72) Inventor: Krister Lindalu, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 18/835,558

(22) PCT Filed: Dec. 6, 2022

(86) PCT No.: PCT/EP2022/084606
§ 371 (c)(1),
(2) Date: Aug. 2, 2024

(87) PCT Pub. No.: WO2023/160851
PCT Pub. Date: Aug. 31, 2023

(65) Prior Publication Data

US 2025/0114916 A1 Apr. 10, 2025

(30) Foreign Application Priority Data

Feb. 28, 2022 (GB) ...................................... 2202752

(51) Int. Cl.
*B25B 11/00* (2006.01)
*B25B 11/02* (2006.01)

(52) U.S. Cl.
CPC .................................... *B25B 11/02* (2013.01)

(58) Field of Classification Search
CPC . B23P 18/00; B23P 19/04; B23Q 3/00; B23Q 2/154; B23Q 3/06; B25B 11/00; B25B 11/02
See application file for complete search history.

(56) References Cited

U.S. PATENT DOCUMENTS 1,639,245 A * 8/1927 Westover ................ B25B 11/00 211/13.1
5,984,293 A 11/1999 Abrahamson et al.
(Continued)

FOREIGN PATENT DOCUMENTS

CN 204934953 U 1/2016
CN 107457725 A 12/2017
(Continued)

OTHER PUBLICATIONS

PCT Written Opinion and Search Report issued in connection with related PCT Patent Application No. PCT/EP2022/084606 dated Mar. 30, 2023.

(Continued)

*Primary Examiner* — Lee D Wilson
(74) *Attorney, Agent, or Firm* — Cozen O'Connor

(57) ABSTRACT

An assembly jig comprises: a support member providing a support surface; a tool configured to receive one component of a faster pair such that the component is not rotatable relative to the tool; one or more alignment members to locate the tool relative to the support member; wherein the one or more alignment members and the tool are configured such that, when the tool is located by the one or more alignment members on the support member, the tool is still rotatable with respect to the support member about an axis perpendicular to the support surface.

20 Claims, 8 Drawing Sheets

(56) References Cited

U.S. PATENT DOCUMENTS

| | | | | |
|---|---|---|---|---|
| 7,913,986 | B2 * | 3/2011 | Fredrickson | B27F 7/155 269/910 |
| 7,971,863 | B2 * | 7/2011 | Chen | B25B 11/002 269/45 |
| 8,998,191 | B2 * | 4/2015 | Gao | B62D 65/026 269/311 |
| 2021/0107099 | A1 * | 4/2021 | Russell | B25B 5/006 |
| 2023/0065396 | A1 * | 3/2023 | Mothersbaugh | B25B 11/00 |

FOREIGN PATENT DOCUMENTS

| | | | |
|---|---|---|---|
| CN | 108058116 | B | 11/2019 |
| DE | 1903411 | A1 | 8/1970 |
| JP | 2000213070 | A | 8/2000 |
| KR | 200369382 | Y1 | 12/2004 |

OTHER PUBLICATIONS

Great Britain Office Action issued in connection with related Great Britain Patent Application No. GB2202752.8 dated Aug. 5, 2022.

Great Britain Office Action issued in connection with related Great Britain Patent Application No. GB2202752.8 dated Mar. 31, 2023.

Great Britain Letter of Intention to Grant issued in connection with related Great Britain Patent Application No. GB2202752.8 dated Mar. 4, 2024.

* cited by examiner

ASSEMBLY JIG

This application is the National Stage filing under 35 U.S.C. 371 of International Application No. PCT/EP2022/084606 filed on 6 Dec. 2022, which claims priority to GB Application No. 2202752.8 filed on 28 Feb. 2022, the contents of both of which are hereby incorporated by reference herein in their entirety to the extent permitted by law.

The invention is in the field of jigs for use in the assembly of items.

BACKGROUND

A common task in assembling parts is to fasten multiple parts together using threaded fastener pairs, such as nuts and bolts, by inserting one part of the fastener pair (e.g., a bolt or a screw) through holes or slots in the parts, and then threading on and tightening the second part of the fastener pair (e.g., a nut or a threaded stand-off) such that the two parts are held together by the fastener pair. This is typically performed manually by holding one end of the fastener pair with a tool in one hand, such as a wrench, while turning the other side of fastener pair with another tool such as a screwdriver held in the other hand. Even with the aid of powered tools (e.g., an electric screwdriver) this can be a time-consuming and laborious task, especially when there are many fasteners involved in a particular assembly.

In an example, printed circuit boards (PCBs) may be assembled together by using multiple threaded fastener pairs, such as nuts and bolts, screws and threaded stand offs, and others, via through holes in the boards. Doing this manually can be a painstaking task, involving for example balancing the boards vertically and keeping them aligned while inserting each fastener pair through the holes in the boards while also holding in place any spacers or washers involved (e.g., that are used under the nut or the screw or to create a gap between the two boards). The operator then needs to use two tools, typically with one tool in each hand, to tighten down each fastener pair. One tool is used to hold the nut or threaded stand-off to keep it from spinning freely, and the other tool is used to turn a screw or bolt to tighten each fastener pair down while still trying to balance the two PCBs and while keeping everything aligned. With only two hands, this can be a difficult and time-consuming task for one operator to do. In addition, items are easily lost in this process or potentially even damaged, e.g. mis-threaded.

An assembly jig that simplified this operation would save time and effort and potentially reduce wastage and would have uses not limited to the assembly of printed circuit boards.

Another problem with screw-connecting fastener pairs is that it can be difficult to release a fastener component from the tool turning or holding the fastener component because torque can cause frictional engagement between the fastener component and the tool and can make it more difficult to separate the fastener component from the tool. An example is a threaded hexagonal stand-off in a hexagonal socket. Under torque, there will be friction between the hexagonal nut and the hexagonal socket that may eventually prevent the hexagonal nut from sliding easily out of the hexagonal socket. In a manual operation involving a socket wrench holding the threaded stand-off and a screwdriver turning screw driver driving a screw into the threaded stand-off from the other side of the assembly, the frictional engagement between the threaded stand-off and the socket wrench can be reduced or eliminated to allow the stand-off to slide out of the socket wrench simply by releasing the pressure on a wrench to allow the socket to rotate freely, or by turning the wrench slightly in the opposite direction to the tightening direction. However, this may not be possible if the tool is fixed and cannot be allowed to rotate freely, or in the case of need to hold multiple stand-offs at once in a jig to expedite the assembly process.

Some embodiments of the invention described below solve some of these problems. However, the invention is not limited to solutions to these problems.

SUMMARY

This summary is provided to introduce a selection of concepts in a simplified form that are further described below in the detailed description. This summary is not intended to identify key features or essential features of the claimed subject matter, nor is it intended to be used to determine the scope of the claimed subject matter.

In the following, assembly jigs are disclosed that are suitable for use in connecting components of a fastener pair on opposite sides of the assembly. Also disclosed are assembly jigs that may be used to connect multiple fastener pairs.

In a first aspect there is provided in the following an assembly jig comprising a support member providing a support surface; a tool configured to receive one component of a faster pair such that the component is not rotatable relative to the tool; one or more alignment members for locating the tool relative to the support member. The alignment member and the tool are configured such that, when the tool is located relative to the support member using the one or more alignment members, the tool is rotatable with respect to the support member about an axis perpendicular to the support surface.

An assembly jig as described here may comprise a plurality of alignment members and a plurality of tools. In the jigs described below with reference to the drawings these are in a one-to-one arrangement, but other configurations of alignment members and tools are possible.

In another aspect there is provided a method of assembling a planar structure comprising first and second assembly boards provided with holes for securing the boards together using one or more threaded fastener pairs, the method comprising: providing an assembly jig as described here, positioning the tool of the jig using the one or alignment members of the jig, inserting a first component of a fastener pair in the tool of the assembly jig, positioning the first and second assembly boards over the assembly jig such that the holes are aligned with the tool, positioning the second component of the fastener pair in alignment with the holes and the first component, engaging a second tool engaged with the second fastener component and driving the second tool to rotate so that one of the first and second components rotates with respect to the other and is driven into the other as a result of their respective threads.

Features of different aspects and embodiments of the invention may be combined as appropriate, as would be apparent to a skilled person, and may be combined with any of the aspects of the invention.

BRIEF DESCRIPTION OF THE DRAWINGS

Embodiments of the invention will be described, by way of example only and with reference to the following drawings, in which.

Figure 1:
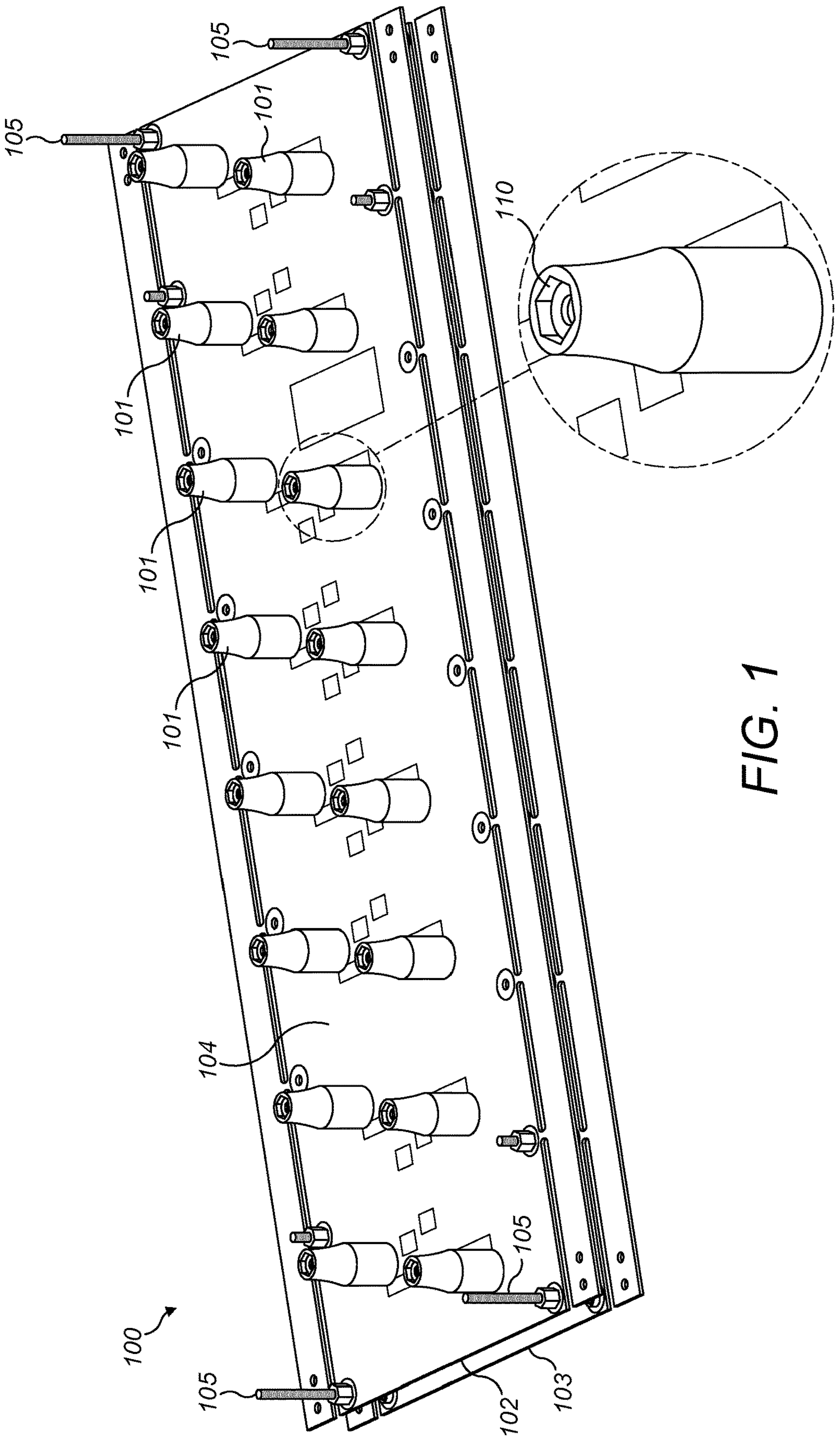
FIG. 1 is a perspective view of an assembly jig according to some embodiments of the invention, comprising a plurality of tools on a common support member.

Common reference numerals are used throughout the figures to indicate similar features.

DETAILED DESCRIPTION

Embodiments of the present invention are described below by way of example only. These examples represent the best ways of putting the invention into practice that are currently known to the applicant although they are not the only ways in which this could be achieved.

In an example, two PCB boards are to be assembled together using multiple threaded fastener pairs into a mated PCB assembly with spacers in between them. In a particular example of a mated PCB assembly, sixteen allen head socket screws need to be inserted through the correct hole in a first PCB, an aluminum spacer, and a second PCB. Each allen head socket screw then needs to be threaded into a corresponding nut or a corresponding threaded stand-off on the other side of the mated PCB assembly and tightened down to an appropriate torque. Holding all of the parts to be assembled in alignment while simultaneously inserting and threading one by one each of the 16 allen head socket screw into a nut or a stand-off on the other side of the assembly is clearly a difficult and time-consuming task. In particular, it would not be practical in a production environment when many hundreds or thousands of such mated assemblies may need to be assembled.

One approach that was initially tried, to speed up the assembly of the two PCB boards while making it easier for the operator, was to create a fixture whereby 16 socket tools were solidly attached to a third PCB board, each socket tool in the correct location corresponding to where the threaded fastener pairs needed to be installed. The nuts or threaded stand-offs were then placed in the fixed sockets, the parts of the mated PCB assembly were placed on top of the nuts or threaded stand-offs in correct alignment, and the allen head socket screws were threaded in and tightened down from the top using an electric screwdriver.

Although this fixture did help to align the parts and hold everything in place while the allen head socket screws were installed into the nuts and treaded stand-offs, the torque from tightening down each of the screws created sufficient friction between the nuts or threaded stand-offs and the fixed sockets such that the nut or thread stand-off could not slide easily out of the socket. This was particularly true of the stand-offs because they were longer than the nuts and were held with more of the stand-off in the socket, thereby resulting in greater friction between the stand-off and the socket and preventing the stand-off from sliding easily out of the socket. The friction could not be released because each of the sockets were solidly fixed to the board supporting them and thus could not be rotated even slightly in the opposite direction of tightening to relieve the torque that was causing the friction. Furthermore, the fixture itself could not be rotated relative to the mated PCB assembly because of the multiple points of contact between the fixture and the mated PCB assembly (e.g., multiple sockets) such that the fixture could not rotate with respect to the mated PCB assembly. With friction from multiple nuts and/or stand-offs against the inside of their corresponding sockets, the total friction force was quite high, making it very difficult if not impossible to lift up and remove the assembled mated PCB assembly from the fixture without a high risk of breaking one of the assembled PCBs.

Although in this example the assembly or workpiece being assembled is a mated PCB assembly, this potential problem exists whenever threaded fastener pairs are tightened down and a tool such as a socket holding one side of the threaded fastener pair is fixed and prevented from rotating slightly against the direction of tightening in order to relieve the friction between the socket and the nut. It can be prevented from rotating either because the fixture cannot rotate relative to the parts being assembled, or because there are multiple sockets and fastener pairs preventing each socket from rotating around its own axis to relieve the friction. Explained by way of example below is an assembly jig that solves this problem and allows for an assembly to be assembled efficiently and accurately while still allowing it to be removed from the assembly jig with greater ease and reduced change of damage to the assembly.

Referring now to FIG. 1, a perspective view of an assembly jig 100 according to some embodiments of the invention is shown, comprising a plurality of tools in the form of socket members 101 (not all of which are labelled) on a common support member which provides a support surface 104 for the tools. In the jig shown in FIG. 1, the support member comprises a board 102 which is one of a pair of boards 102, 103 resiliently held in a spaced relationship, described further below with reference to FIGS. 5 and 6.

Alignment pins 105 fixed to board 102 can help to align the parts to be assembled with the assembly jig 100. Note the alignment pins 105 in this example also prevent the assembly jig 100, and in particular board 102 from rotating relative to the parts being assembled when they are engaged with the workpiece. Specifically, board 102 cannot rotate relative to the parts being assembled around an axis that is perpendicular to support surface 104.

The jig 100 is designed for screw-connecting components of a plurality of threaded fastener pairs on opposite sides of the mated printed circuit board "PCB" assembly described above, but not shown in FIG. 1. A PCB is one example of a planar structure, the assembly of which may benefit from use of a jig as described here. Thus, in the jig shown in FIG. 1, tools in the form of socket members 101 are in an arrangement corresponding to through holes in the PCB via which the plurality of fastener pairs are to be connected.

The boards 102, 103 may be purpose-made for a particular PCB or other planar structure, or either or both of them may conveniently comprise a PCB similar to the one on which the fastener pairs are to be connected.

Instead of a socket member 101 as illustrated, any of the jigs described here may comprise an alternative tool such as a screw driver head, or any other tool suitable for use in screw-connecting threaded fastener pairs. Thus, each tool is configured to receive one component of a fastener pair such that the component is not rotatable relative to the tool, whereby the component and the tool rotate together relative to the other component of the threaded fastener pair in order to screw-connect the pair of components.

In the jig shown in FIG. 1, each tool can comprise a socket member 101 having opposing ends. One end of each socket member 101 rests on the support surface 104. Each socket member can have a first non-cylindrical socket 110 in the opposite end to receive a similarly shaped component, for example a nut or a stand-off with a hexagonal shape on the outside. Other shapes such as square nuts or stand-offs with one pair of wrench flats are also possible. Each socket member may have a second socket in the end resting on the support surface. This type of socket tool is well known in the art and socket tools are readily available for purchase individually and in the form of "socket sets" from hardware stores and tool suppliers. Thus, the tools may comprise standard commonly available tools. Each socket may have a surface facing the respective end to support a component inserted in the socket. Each socket member may have through hole from one end to another of narrower diameter than the respective sockets.

The jig of FIG. 1 further comprises one or more alignment members, not visible in FIG. 1, for aligning each tool in order to locate it relative to board 102. The alignment members hold each of the tools in the right place to match up with the holes in the mated PCB assembly. The alignment members and the tools are configured such that when the tools are located using the alignment members, the tools are placed in the correct location relative to board 102, but are still rotatable with respect to board 102, about an axis perpendicular to the support surface. This will be the axis of relative rotation of the components of the fastener pair. The rotation permitted may be full rotation or limited rotation relative to board 102, and there may be various degrees of friction impeding the rotation depending on the configuration of the assembly jig, but regardless each socket member 101 is not fixed to board 102 such that it cannot rotate at all around its on axis. Each socket member 101 can also be lifted up above the surface 104 as will be described further below.

In the illustrated jigs there is a one-to-one correspondence between tools and alignment members but other configurations are possible. Additionally or alternatively, in the illustrated jigs the alignment members are fixed to the support surface 104.

In the jigs shown here, each tool comprises a socket member and the alignment members comprises a nut fixed to board 102. Additionally or alternatively the alignment members may each comprise a screw that extends from below up through a correspondingly located hole in board 102 and through a through hole in the socket member 101 where it can thread into a threaded nut or stand-off that fits non-rotatably into the top end of the socket member 101. However other forms of tool and alignment members may be provided.

Figure 2B:
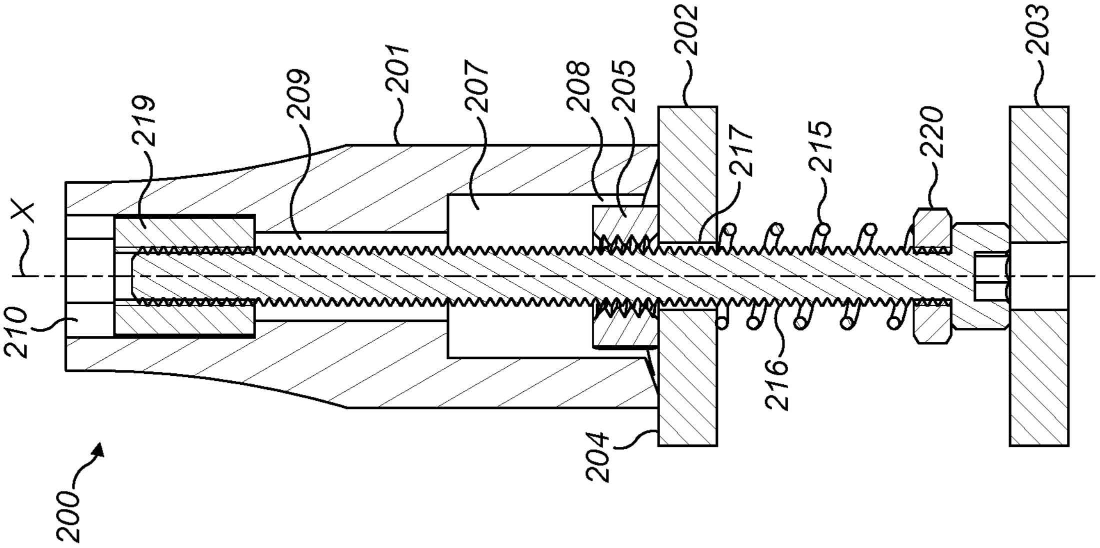
FIGS. 2*a* and 2*b* are respectively a side elevation and a cross section of an assembly jig according to some embodiments of the invention comprising a single tool.
Figure 2A:
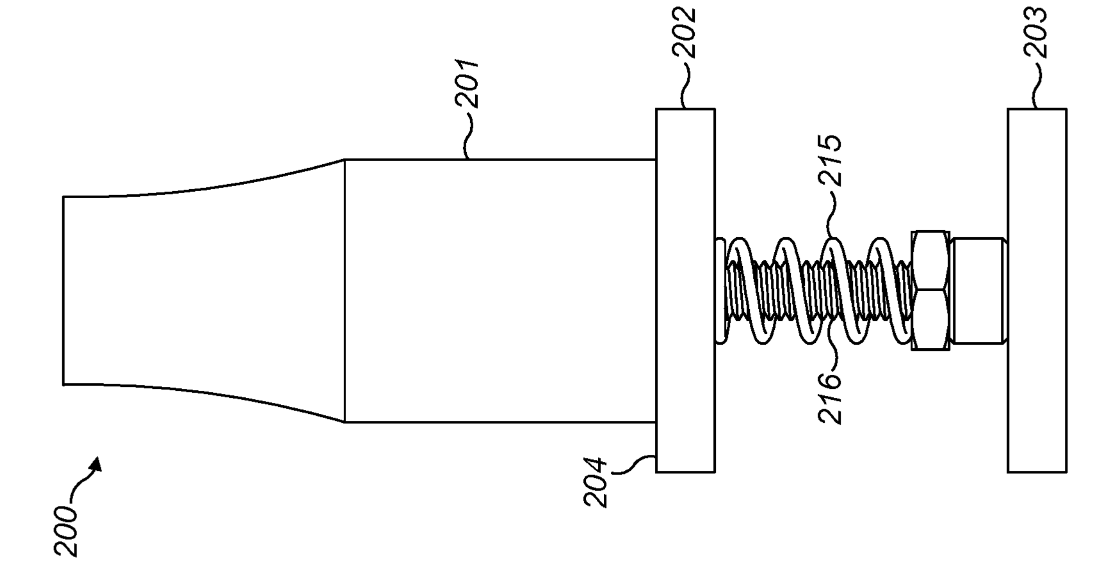

FIGS. 2*a* and 2*b* show an assembly jig, similar to that of FIG. 1 but with only one socket, suitable for use in screw-connecting the components of one threaded fastener pair. In all other respects the jigs shown in FIGS. 1, and FIGS. 2*a* and 2*b*, are similarly constructed and operate according to the same principle. For example, the jig in FIGS. 2*a* and 2*b* show a single socket tool, whereas the jig in figure comprises 16 of the same socket tools, each of which functions in the same manner. Therefore, FIGS. 2*a* and 2*b* will be referred to in order to explain the principles of operation of all jigs described here.

The jig 200 of FIG. 2 comprises a tool in the form of a socket member 201 positioned on a support member in the form of one of a pair of boards 202, 203, providing a support surface 204. An alignment member in the form of a nut 205 is fixed to the support surface 204 of board 202. Similarly, to the jig of FIG. 1, the alignment member and the tool are configured such that when the tool is received by an alignment member, the tool is rotatable with respect to the support member 202 about an axis perpendicular to the support surface 204, shown as axis X in FIG. 2*b*.

In the jigs described here, this rotatability is achieved by the socket member 101 or 201 having a second socket 207, in the end resting on the support surface, which receives the alignment member in the form of nut 205. The exterior surface of the nut 205 and the interior surface of the second socket 207 may be cylindrical, with the cylinder axes aligned with the axis X, whereby the socket member 101, 201 and the nut 205 are fully rotatable with respect to each other. However, in the illustrated jigs the alignment member and the second socket 207 have non-cylindrical surfaces. They may for example comprise standard components such as a nut 205 for the alignment member and a socket member 101, 201 with a square socket 207 for mounting on a drive tool. By suitable choice of the size of the nut and socket member, a clearance 208 may be provided between the interior surface of the second socket 207 and the nut 205, to allow at least partial rotation of the socket member 201 with respect to the nut 205. In an example the second socket 207 is a standard ¼" square drive, and the nut is a M3.5 nut. It is not necessary for the socket member 101, 201 or other tool, to be fully rotatable with respect to the alignment member, and the jig 100 or 200 may be designed such that each tool is rotatable with respect to a corresponding alignment member about the axis by only a limited extent.

In the jigs shown here, the support member is one of a pair of boards, 102 and 103 or 202 and 203, resiliently held in a spaced relationship. This may be achieved in a variety of ways that will be known to those skilled in the art. Further, the relationship may be such that the boards may be brought together against the resilient force, the purpose of which is described further below.

Figure 5:
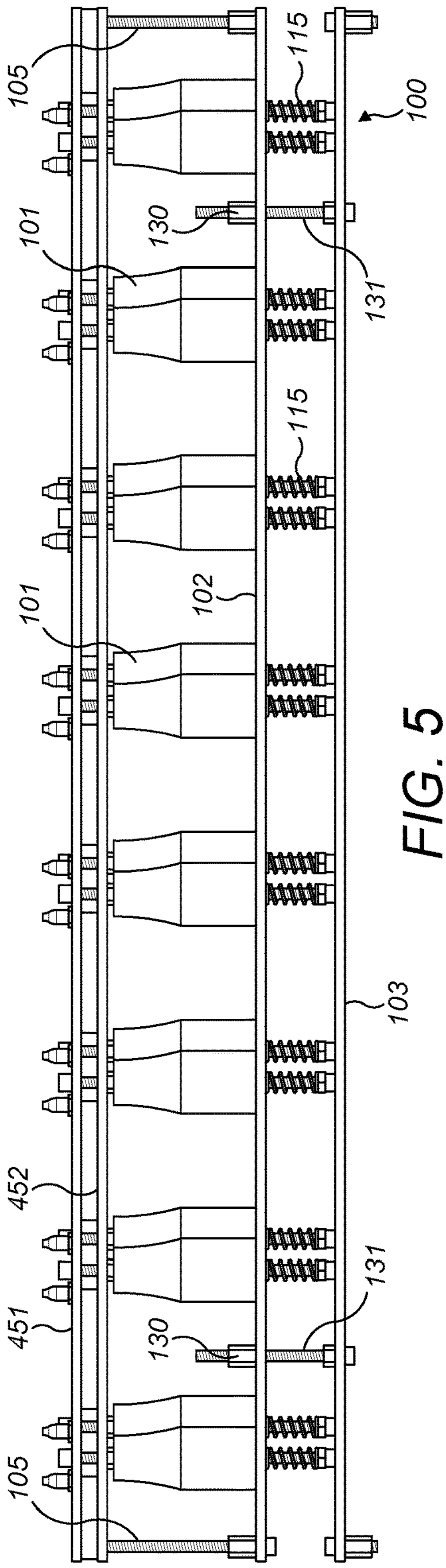
FIG. 5 is a side elevation of a planar structure in the form of a pair of mated PCBs, positioned over the assembly jig of FIG. 1.
Figure 6:
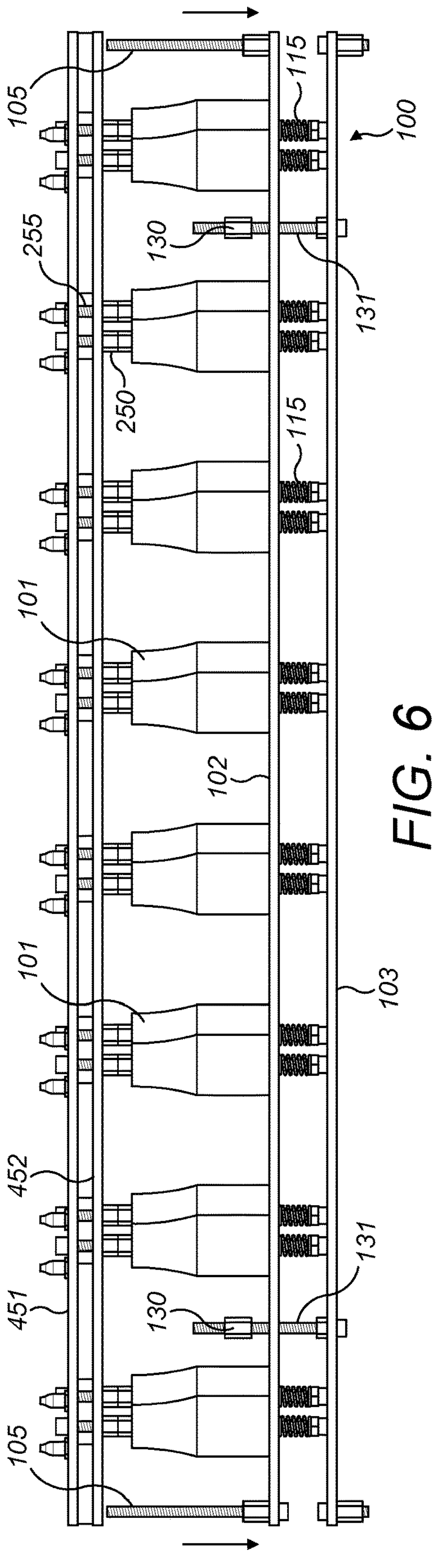
FIG. 6 is a side elevation corresponding to FIG. 5 in which upper and lower boards of the assembly jig are brought together to dislodge fastener components from their respective tools.

For example, as illustrated in FIGS. 2*a* and 2*b*, a spring 215 maintains a spacing between the boards 202, 203. One spring or other resilient member may be provided corresponding to each tool, as indicated in FIGS. 5 and 6 where a spring 115 is provided corresponding to each socket member 101 or other tool. In the jig of FIG. 1 stops are provided to counteract the resilient force and limit the spacing between the boards. One or more similar stops may be provided for the single-tool jigs described here. The illustrated stops, most clearly visible in FIGS. 5 and 6, comprise nuts 130 threaded on bolts 131. The bolts 131 are fixed to the board 103 and pass through holes in the board 102 that acts as the support member. The nuts 130 have a diameter greater than the holes so that the support member or board 102 can be biased against the nuts by the resilient force, for example from the springs 115. As can be seen in FIG. 5 for example, the stops or nuts are provided at separate locations from the tools and the corresponding springs. Other forms of stop may be provided as will be familiar to those skilled in the art.

Referring back to FIG. 2*b*, it can be seen that each spring 115, 215 may comprise a coil spring. The head of a threaded bolt 216 rests on the surface of the board 203 and passes through the spring 215, through a hole 217 in the support member or board 202, through the nut 205, through the through hole 209 in the socket member 201 and into the first socket 210 of the socket member 201.

In any of the jigs described here the tool or tools may be removably retained on the support surface.

A stand-off 219 is positioned in the first socket 210 to support a component of a fastener pair, in this case a nut, at a suitable height. The stand-off may fit non-rotatably into the first socket 210 by sliding along the axis X. The illustrated stand-off has a threaded interior through hole which engages the end of the threaded bolt 216. The stand-off 219 serves to removably secure the socket member on the support surface.

It should be noted that the nut 205 also has a threaded interior but in this example it is of a sufficiently large diameter not to engage the threaded bolt 216. The threaded interior is present because a standard nut has been used but is not essential for the operation of the jig. At the point where threaded bolt 216 passes through nut 205, the interior of the nut could just be a through hole and/or the outside diameter of the bolt 216 could also be a shaft with no threads on that portion of it.

A nut 220 is threaded around the head of the threaded bolt 216 so that one end of the spring butts against the surface of the nut 220 and the other end of the spring 215 butts against the surface of the board 202 opposite to the support surface 204.

Additionally or alternatively to nut 205, alignment of the socket tool 101 or 201 relative to board 202 is also provided by the threaded bolt 216 being inserted through hole 217 in board 202 and nut 205, as well as by the stand-off 219 being held inside the socket 210 of socket tool 201 by the threaded bolt 216.

In the jigs shown in FIGS. 2*a* and 2*b*, the top board 202 is fixed during the assembly process so that it is not rotatable relative to the parts being assembled (not shown in FIGS. 2*a* and 2*b*). This means support surface 204 and also in this case the nut 205 are by extension also not rotatable relative to the parts being assembled. In other words, the top board 202 cannot rotate around axis X in FIG. 2*b*, or around any other axis perpendicular to surface 204, relative to the work piece being assembled. Board 202 may be prevented from rotating with respect to the workpiece being assembled by an alignment pin or pins, not shown in FIG. 2*a* or 2*b* but similar to the alignment pins 105 shown in FIG. 1, that help to hold and align the parts being assembled with the socket tool 201. Board 202 could also be rotatably fixed relative to the workpiece by other points of contact that provide alignment and or support between the assembly jig 200 and the parts being assembled during the assembly process.

An example of use of the jig 200 to screw-connect two components of a fastener pair will now be described with reference to FIG. 2*c*. The fastener pair comprises a threaded nut 250 shown received in the socket 210 of the socket member 201 and supported by the stand-off 219, and a mating screw 255. Two tools are used to connect the components, the two tools being the socket member 201 and a screw driver of which the head 260 is shown. The screw 255 may for example have a hexagonal allen head which is received in a hexagonal socket which forms the head 260 of the screw driver. The screw driver itself could be a manual screw-driver, a hand-operated electric screwdriver, or even a robotically operated screw driver, for example those used in high-volume assembly operations.

The fastener pair is to secure together two boards, for example printed circuit boards 251, 252, which are shown held spaced apart by spacers 253. These are referred to as the boards of the assembly or assembly boards, to differentiate them from the spaced boards of the assembly jig. The assembly boards are provided with holes through which one of the components of the fastener pair may pass. In an example the assembly jig boards may be identical to one of the assembly boards since the assembly boards already have holes drilled in the correct location for aligning of the socket tools. The assembly boards may have electronic components mounted onto them.

It should be noted that the assembly jig is not limited to use with assembling PCBs as shown in the current example but can be used for any type of part assembly that uses threaded fastener pairs, including both small and large assemblies. For example, an assembly jig according to the current disclosure could be used to help with assembling parts in a consumer product such as a TV, or in vehicles and aircraft. Examples of the assembly jig could even be used on much larger industrial scale assembly operations, for example in the construction industry to help fasten multiple fastener pairs typically used to attach a steel beam to another steel beam or to a bracket.

Figure 2C:
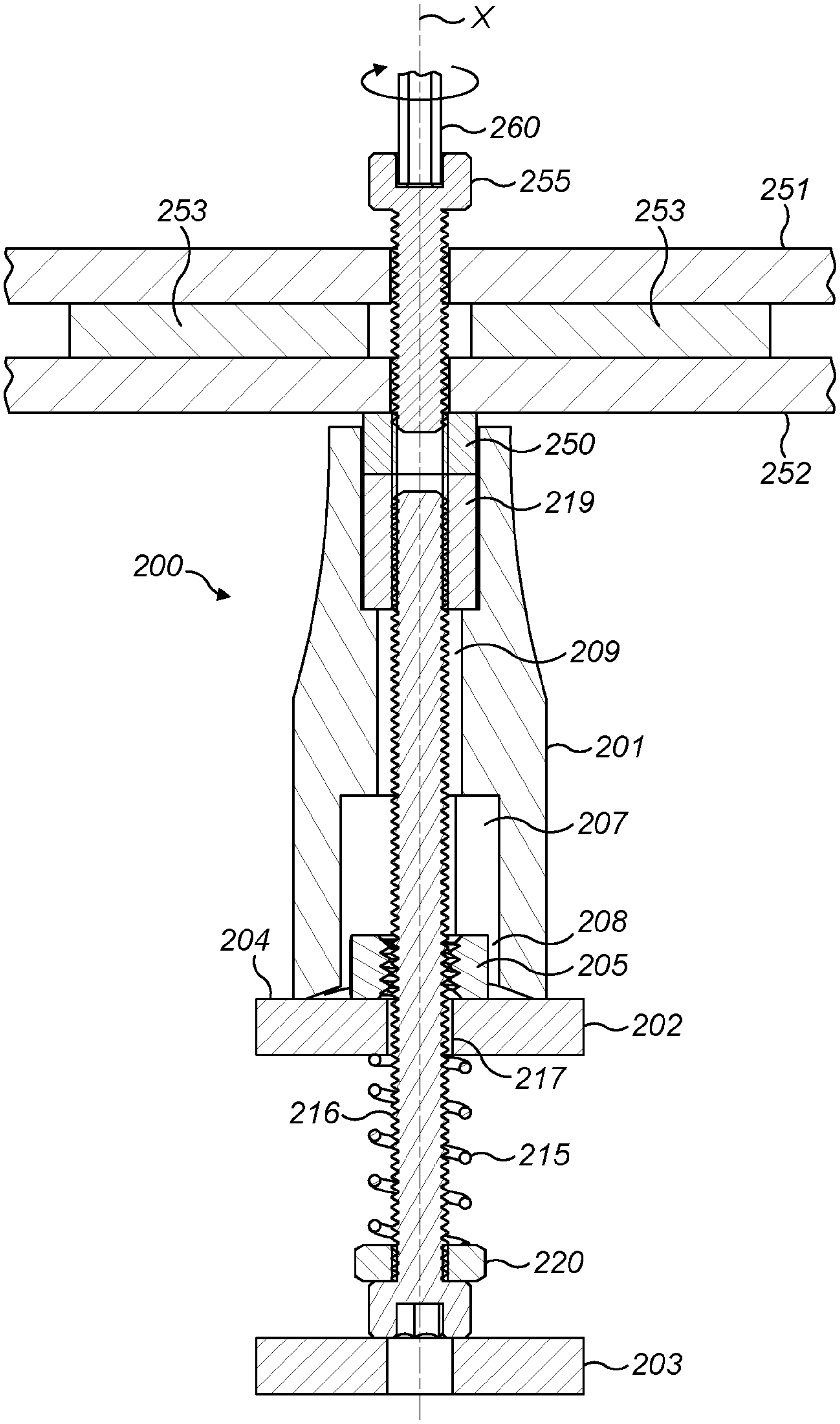
FIG. 2*c* is a cross section similar to FIG. 2*b* additionally showing a board assembly and a fastener pair.

To assemble the boards as shown in FIG. 2*c*, first the jig is assembled by positioning the tool of the jig using the one or more alignment members. Then a first component of the fastener pair is positioned in the tool of the assembly jig. Then the assembly boards are positioned over the assembly jig such that the holes are aligned with the tool. These can be done, for example with the aid of alignment pins, not shown in FIGS. 2*c* and 2*d* but similar to the alignment pins 105 shown in FIG. 1. The second fastener component is aligned with the holes contacting the first component. A second tool is then engaged with the second fastener component and driven to rotate so that the second fastener component rotates with respect to the first fastener component and the fastener pair is pulled together by their respective threads. Thus, in use the tool of the assembly jig is an idle tool and the tool introduced from the other side of the boards to be assembled is a driving tool. Although the jig tool is an idle tool in that it is not driven to rotate, it serves the important function of keeping the first fastener component from spinning freely while the second threaded fastener is threaded into or onto it.

On initial engagement and driving of the tool that is used to turn the second component of the fastener pair, pressure is typically applied by the operator of the driven tool along the drive axis, which in turn can push the idle tool of the assembly jig down onto the surface of the support member with greater force, causing friction between the facing surfaces of the idle tool and the support surface of the support member. This friction resists rotation of the idle tool with respect to the support surface in order to help prevent the first fastener component from rotating while the second fastener component is driven into or onto it. The friction can be adjusted to provide the necessary torque for holding the first fastener component in place.

Keeping the first fastener component from spinning can be achieved if the tool holding the first fastener component is non-rotably fixed to the support member, which is itself cannot rotate relative to the parts being assembled. This was the first fixture that was attempted for solving the problem of assembling the mated PCB boards more efficiently. However, this led to a problem of not being able to release the boards. In the example shown in FIGS. 2*c* and 2*d*, socket tool 201 can rotate relative to board 202. This would seem contrary to the way socket tools are intended to work, since most socket tools rely on a fixed connection to apply torque to the nut. Some rotation of the tool 201 and the nut 250 is permissible while threading in the screw 255, as long as the screw 255 can still thread down into nut 250. The assembly jig can also be designed to allow only limited rotation of the socket tool 201 so that the nut 250 can rotate only a certain amount before it is prevented from rotating further. If and when the socket tool 201 reaches the limit of its rotation, it then also keeps the nut 205 from spinning any further while the screw 255 is driven into the nut.

With reference again to the specific example in FIG. 2*c*, nut 250 is held in socket member 201 so that it cannot rotate about axis X relative to the socket member 201. Socket member 201 is not fixed to board 202 and can rotate around axis X. However, there can be friction between socket tool 201 and the surface 204 of board 202 because board 202 is pushed up into socket tool 201 by spring 215 while the socket tool 201 is held down by stand off 219. There may also be additional friction introduced from contact between the socket tool 201 and any one or all of the alignment members, such as alignment member 205, further helping to resist rotation of the idle tool. In an example, alignment member 205 is rotationally fixed to board 202 and can introduce additional friction or resistant to rotation of socket tool 201 by having some contact with socket tool 201 while still allowing it to rotate. In an example, the adhesive used to fix alignment member 205 to the surface 204 of board 202 when applied spreads out somewhat past the outside dimensions of the nut such that the bottom of socket tool 201 comes in contact with some of the cured adhesive, causing further friction. In another example, alignment member 205 itself may also limit the amount of rotation of the socket tool 201. For example, if member 205 is a M3.5 nut, its outside dimensions can be such that it will allow the ¼" square shaped drive socket 207 to rotate a certain amount before the square shape engages the hexagonal outside of alignment member 205 and prevents the socket tool 201 and hence nut 250 from rotating any further in that direction. Note however in the preceding example that in the absence of any torque from the nut the socket tool 201 can still rotate in the other direction, until such point that the hexagonal shape of the M3.5 nut 250 once again engages the ¼" square shaped drive socket 207. In other words, there is some “slop” present that allows socket tool 201 to rotate around nut 205 to a limited extent.

Still referring to FIG. 2*c*, it may not seem obvious that the nut 205 can be sufficiently held from rotating while screw 255 is driven into it without the socket member 201 being rotatably fixed to board 202. However, the torque required to keep nut 250 from spinning does not necessarily have to be equivalent to the full torque that screw 255 is driven to, for example by using a torque screwdriver. As the fastener pair is tightened the nut 250 and the screw head 255 are drawn together by the threads. When the first fastener component (nut 250) is pulled into contact with the surface of the bottom board of the assembly this contact will further resist the rotation of the first fastener component around the axis X. As the fastener pair is tightened down, the normal force with which nut 250 is pulled into the bottom of assembly board 252, can become quite high. The higher normal force can translate into greater friction resistance to rotation and thereby increase the holding torque of nut 250 without requiring additional torque from the socket member 201.

If the frictional force preventing the socket tool 201 from spinning freely as the screw 255 is tightened down is insufficient, the frictional force resisting the rotation of socket tool 201 can be increased. In the example shown in FIG. 2*c*, this can be achieved in a number of ways. For example, the friction force between socket tool 201 and the surface of the support member can be increased by tightening screw 216 into standoff 219 so it compresses spring 215 more, increasing the normal force and thereby the friction between the socket tool 201 and the surface 204 of support board 202. The friction between the socket tool 201 and the surface 204 of support board 202 can also be increased by using a spring with a higher spring constant for spring 215.

In an example, the hexagonal shape in socket 210 of socket tool 201 and the hexagonal outside shape of the nut 250 will engage as screw 255 is driven into nut 250. Friction between nut 250 and the inside of socket 201 arises from torque that the socket tool 201 needs to apply to the nut to keep it from spinning. At the end of the tightening process, the engagement between the two parts and the friction will remain unless the socket tool 201 can be rotated slightly backwards opposite to the direction of tightening. This would not be possible to do if the socket tool 201 is rotationally fixed to board 202 and board 202 is prevented from rotating relative to the parts being assembled. As shown during the previous experiments describe above, it has been shown that the friction force between the nuts or stand-offs and a rotationally fixed socket tool can be high enough to prevent extraction of the assembled workpiece from a fixture.

Even if only a limited amount of rotation of the jig tool with respect to the support member is possible, for example due to the configuration of the tool and the alignment member, this can reduce frictional engagement of the fastener component with the jig tool and thereby make it easier to release the component from the jig when the screw connection of the fastener components is complete. In the example shown in FIGS. 2*c* and 2*d*, this can be achieved by reducing the rotational friction between the socket tool 201 with respect to the board 202 and the rest of the assembly jig, including alignment member 205 to allow it to more freely rotate in the opposite direction to tightening. This then reduces the engagement and friction between the inside of the socket tool 201 and the nut 250, allowing the nut 250 to more easily slide out of the socket tool 201 and thereby allowing the now-assembled workpiece to be more easily removed. Note that the nut 250 could also be a threaded stand-off, which can sometimes be even harder to remove from the socket tool because of its longer length and the correspondingly higher friction between the stand-off and the inside of the socket tool.

To use again the specific example illustrated in FIG. 2*c*, in order to secure the two boards 251, 252 together, the nut 250 of a fastener pair is placed in the first socket 210 of the socket member 201 on the stand-off 219. Then the boards are positioned with their holes aligned with each other and with the first socket 201. The screw 255 is introduced from the other side of the pair of assembly boards 251, 252, in other words the outer side opposite to the side facing the jig 200. At this point the end of the screw 255 may touch the nut 250. The screw 255 is then driven to rotate so that the respective threads of the nut 250 and screw 255 engage and the screw is driven along the axis X. During this time the downward pressure by the operator of the screw driver causes friction between the contacting surfaces of the socket member 201 and the support surface 204 so that rotation of the socket member with respect to the support surface, or board 202, is further resisted. Note that the screw can also be the part that is inserted into the jig tool (if it has an appropriate head to match the jig tool) such that screw sticks up through the holes in the boards 251 and 252, and the nut is driven onto the screw from the top.

Once the screw can no longer be driven axially, for example due to contact between the head of screw 255 and the board 251, as described above the friction between the contacting surfaces of the socket member 201 and the nut 205 can prevent the nut 205 from easily sliding out of socket tool 201. The assembled workpiece is ready to be removed from the assembly jig so it can move onto the next state of the manufacturing process, but it needs to be first released from the assembly jig. Allowing the jig tool to rotate with respect to the support surface in the opposite direction to tightening, even by a limited extent, can help to relieve the friction between the jig tool and the first fastener component such that the first fastener component can easily slide out of the jig tool, allowing the assembled workpiece to be removed from the assembly jig.

Figure 2D:
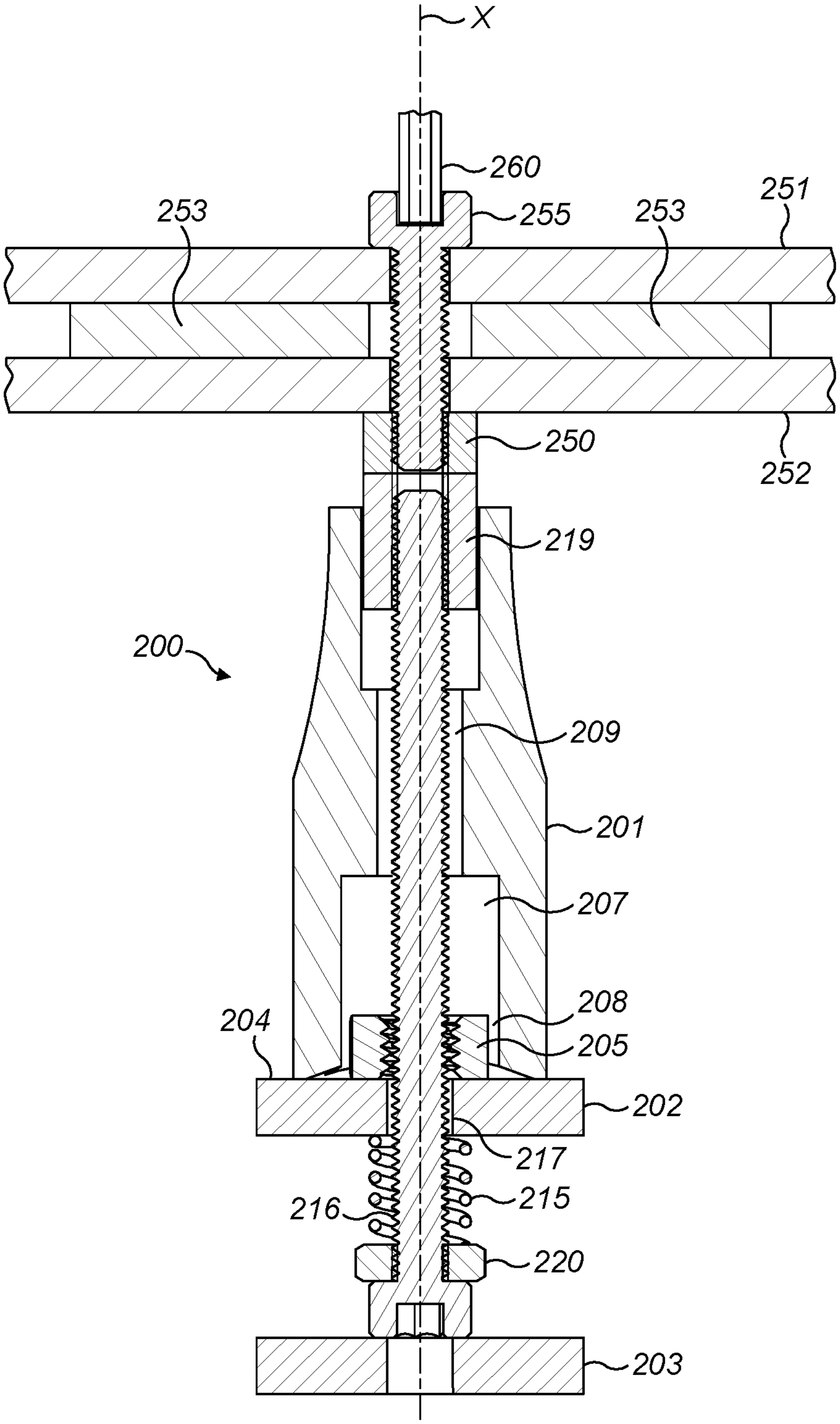
FIG. 2*d* is a cross section similar to FIG. 2*c* showing boards of the assembly jig brought together to dislodge a fastener component from its respective tool.

In FIG. 2*d*, the assembly jig of FIG. 2*c* is shown with board 202 pushed down against spring 215, reducing the distance between board 202 and board 203. This helps to release the assembled workpiece from the assembly jig, as will be described in further detail here. In FIG. 2*d*, the two boards 251 and 252 have now been assembled as described above with a fastener pair comprising screw 255 and nut 250. The head of screw 255 is in contact with the top surface of assembly board 251, and the nut 250 is in contact with the bottom of assembly board 252. Screw 255 is fully threaded into nut 250. The fastener pair is exerting a clamping force pulling assembly boards 251 and 252 and spacers 253 together, and the nut 250 is no longer frictionally held inside the socket tool 201, thus allowing the assembled boards 252 and 251 to be easily removed from the assembly jig.

The release of the assembled workpiece is achieved by pushing board 202 down against the spring 215, for example either manually by hand, or by a machine to operate the release mechanism. This release mechanism first reduces or removes the force with which the bottom of the socket tool 201 is pushed into surface 204 of board 202, thereby reducing or removing the rotational friction between the socket tool 201 and the surface of board 204 and allowing it to rotate more easily in the opposite direction of tightening of the fasteners. This in turn reduces or removes the friction between the nut 250 and the socket tool 201, allowing nut 250 to more easily slide out of socket tool 201, thereby releasing the assembled workpiece. In some cases, there may be friction between alignment member 205 and socket tool 201 present that still prevents socket tool 201 from rotating sufficiently freely to fully remove the friction between socket tool 201 and nut 250. In this example, a plunger mechanism formed by screw 216 and stand-off 219 can help to physically push the nut 250 out of the socket tool 201. As board 202 is pushed down against the spring, the friction between assembly member 205 and socket tool 201 pulls the socket tool 201 down with board 202, and the plunger assembly pushes nut 250 out of the top of socket 201. In the case that the friction between assembly member 205 and socket tool 201 is insufficient to pull the socket tool 201 down with board 202, the act of lifting the socket tool 201 above the assembly member 205 also allows socket tool 201 to rotate sufficiently to release any friction still holding nut 250 in socket tool 201.

Figure 4:
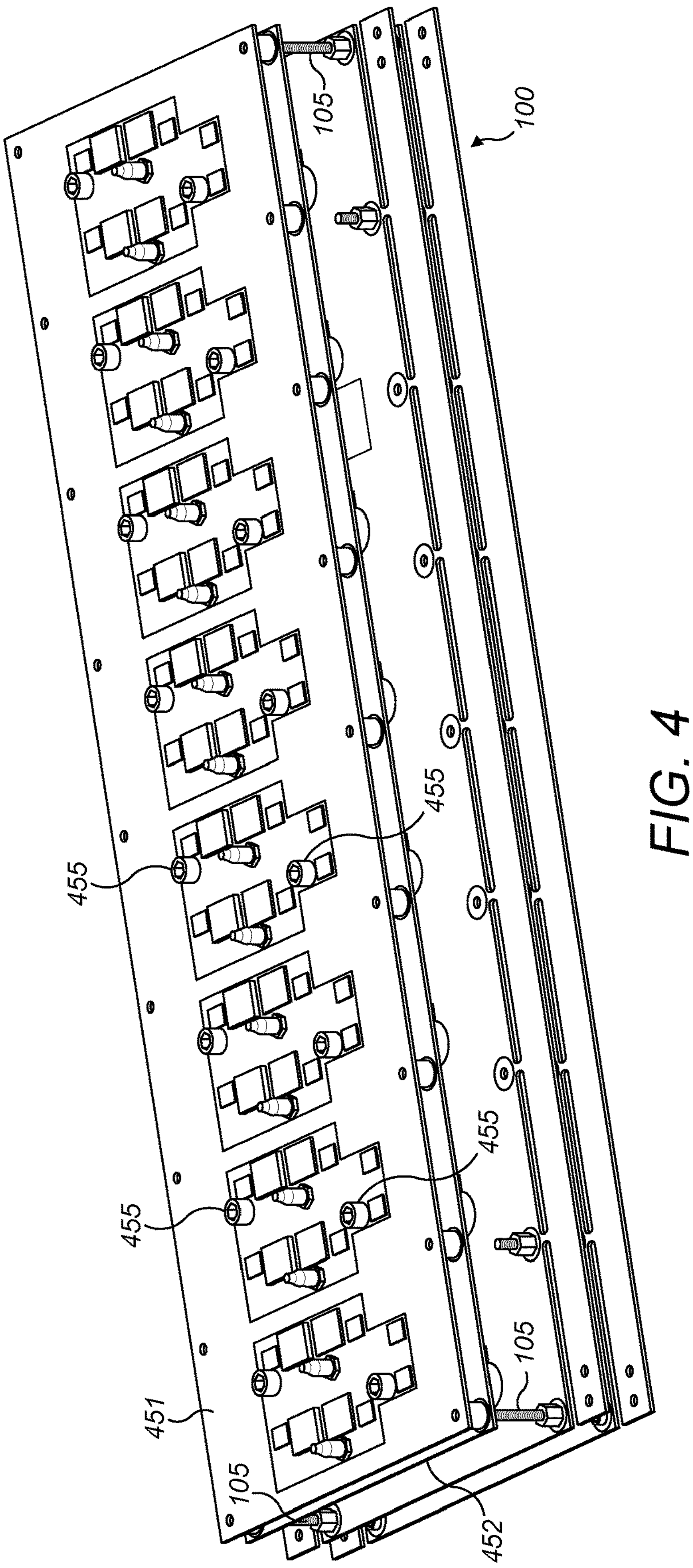
FIG. 4 is a perspective view of a planar structure in the form of a pair of mated PCBs, positioned over the assembly jig of FIG. 1.

It will be appreciated that the jig 100 of FIG. 1 may be used in an analogous way to secure two boards together using multiple fastener pairs. FIG. 4 shows a pair of assembly boards 451, 452 positioned over the assembly jig 100. The tools of the assembly jig 100 are aligned with aligned holes in the assembly boards 451, 452. The holes are shown covered by screws 455.

The assembly jig comprises additional alignment members for aligning items to be assembled, in this case the assembly boards 451, 452, with respect to the assembly jig. As shown in FIG. 4 these comprise screws 105 upstanding from the support surface of the jig that align with holes in one or both of the assembly boards 451, 452. A single-tool assembly jig such as that shown in FIGS. 2*a*-2*d* may similarly comprise suitable additional alignment members.

The problem of a fastener becoming frictionally engaged in a tool may be greater where there are multiple fastener pairs to be screw-connected and the pairs are not separable from each other. Therefore, the ability of the tool of the jig to be rotatable with respect to the support surface is particularly useful in a multi-tool jig, where releasing multiple fastener components from their respective jig tools simultaneously can require quite a bit of force.

The boards 451, 452 of FIG. 4 may be assembled by first inserting a nut into each socket 110 of the assembly jig 100, then positioning the boards over the jig with the holes aligned with the tools. Then a screw may be inserted into each hole in the side of the boards furthest from the jig, to contact a respective nut. The screws may then be driven in turn to engage them with the corresponding nuts.

Even when the jig tool is rotatable with respect to the support surface, and particularly when this is only to a limited extent, the jig and the assembly of boards may become frictionally engaged after the fastener pair has been screw-connected. Therefore, any of the jigs described here may include a plunger arrangement to help dislodge the connected fasteners from the tool, or in the case of a multi-tool jig a plunger arrangement to help dislodge respective connected fasteners from the respective tools in which they were received.

As noted in connection with FIGS. 2*a*-2*c*, the assembly jig may comprise a pair of boards resiliently held in a spaced relationship. The plunger arrangement may comprise a plunger arranged between the pair of boards of the assembly jig, aligned with a corresponding alignment member. The alignment member and the tool may have a through hole such that with a tool received by the alignment member, when the first and second boards are brought together to reduce the space between them the plunger dislodges a fastener component received in the tool. This is illustrated in FIGS. 5 and 6 for a multi-tool jig. The same operating principle applies to the single tool jigs described here.

FIG. 5 shows a completed assembly comprising boards 451, 452 secured by multiple fastener pairs, with the lower component of each fastener pair as shown received in a corresponding tool.

FIG. 6 is a view similar to FIG. 5 in which the pair of boards of the assembly jig have been brought together to reduce the space between them. Here each fastener pair comprising a nut 250 and screw 255 has been dislodged from its respective tool by the release mechanism allowing the jig tools to rotate more freely and by a plunger extending between the boards 451, 452.

This is shown in more detail in FIG. 2*d* and described above by way of example for a single tool jig. In the jig shown in FIGS. 2*a*-2*d*, the plunger comprises the screw 216 and stand-off 219.

Figure 3:
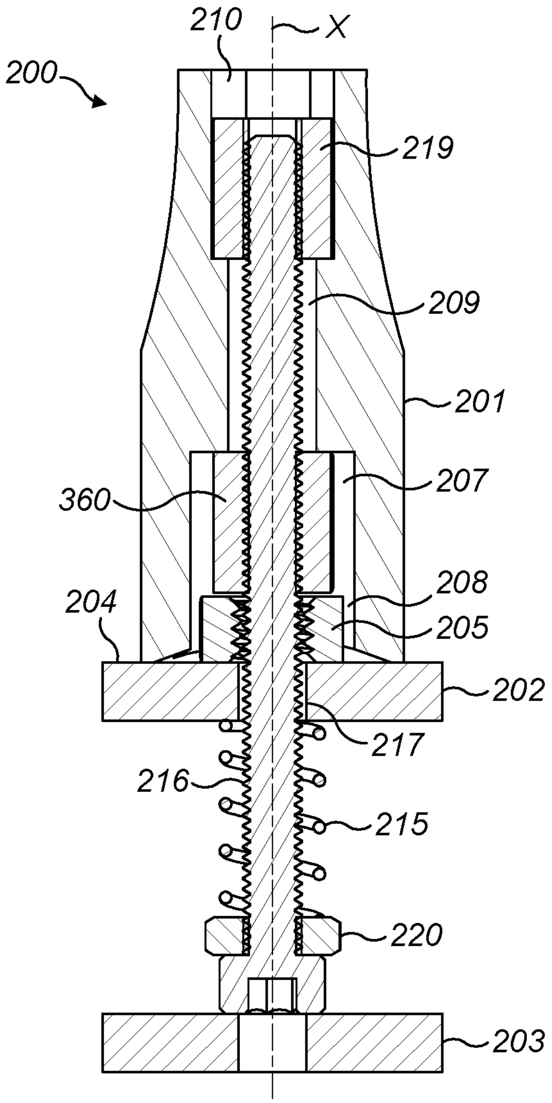
FIG. 3 shows in cross section an alternative assembly jig comprising a single tool according to some embodiments of the invention.

FIG. 3 shows an alternative single tool jig. The jig of FIG. 3 is the same as the jig of FIGS. 2*a*-2*d* except that an additional stand-off 360 is provided between the alignment member comprising nut 250 and the end surface of the second socket 207.

The addition of the standoff inside the second socket of the socket member 201 changes the mechanism from pushing out the nut 250 of FIGS. 2*c*-2*d* to lifting the whole socket member 201 until it clears the alignment member 205. When board 202 is pushed down against spring 215, it takes alignment member 205 along with it and pulls it out of the bottom of the socket tool 201. Socket tool is held in place and prevented from going down along with board 202 by standoff 360 that has been threaded onto screw 216 and sits inside socket 207 of socket 201. Once the socket tool 201 has been lifted clear of alignment member 205, there is no longer any possibility of rotational friction between socket tool 201 and alignment member 205, or between socket tool 201 and the upper surface 204 of board 202. Socket tool 201 therefore has more freedom to rotate relative to board 202 around axis X and to thereby release the friction between nut 250 (not shown) and socket 210 at the top of socket tool 201, allowing nut 250 to slide out of socket 201 more easily. This assembly jig is particularly suited for assemblies using relatively thin nuts instead of long stand-offs as there is less engagement between the socket tool 201 and the thin nut compared to with a longer stand-off, so the friction holding the nut in the socket is lower and there is less requirement for a plunger mechanism to eject the nut out of the socket tool 201.

Any of the jigs described here may be configured to allow additional means of assembling an assembly. For example, some of the illustrated tool positions may include one or more fixed tools for different kinds of fastener. Fasteners could include the hexagonal head fasteners and sockets and the allen head socket screws described in the example, but could also include square head fasteners, screws with Philips, Robertson, Torx heads, or many others. Some of the illustrated tool positions may not be used in some jigs or may be used for different purposes.

It will be understood that the benefits and advantages described above may relate to one embodiment or may relate to several embodiments. The embodiments are not limited to those that solve any or all of the stated problems or those that have any or all of the stated benefits and advantages.

The figures illustrate exemplary apparatus and methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. An assembly jig for use in assembly of items using one or more fastener pairs, the jig comprising:
- a support member providing a support surface;
- a tool configured to receive one component of a fastener pair such that the one component is not rotatable relative to the tool; and
- one or more alignment members for locating the tool relative to the support member;
- wherein the one or more alignment members and the tool are configured such that, when the tool is located relative to the support member using the one or more alignment members, the tool is rotatable with respect to the support member about an axis perpendicular to the support surface.

2. The assembly jig of claim 1, further comprising:
- a plurality of tools and a plurality of alignment members for locating the plurality of tools relative to the support member,
- wherein the plurality of alignment members and the plurality of tools are configured such that, when each tool is located relative to the support member using the one or more alignment members, the tool is rotatable with respect to the support member about an axis perpendicular to the support surface.

3. The assembly jig of claim 1, wherein the one or more alignment members and each tool are configured such that the tool is rotatable with respect to the support member about the axis by only a limited extent.

4. The assembly jig of claim 1, wherein each tool comprises a socket member.

5. The assembly jig of claim 4, wherein the socket member comprises a first socket configured to receive the one component of the fastener pair and the assembly further comprises a stand-off positioned in the first socket to support the one component of the fastener pair during assembly of items.

6. The assembly jig of claim 5, wherein the stand-off serves to removably secure the socket member on the support surface.

7. The assembly jig of claim 1, further comprising one or more additional alignment members for aligning items to be assembled with respect to the assembly jig.

8. The assembly jig of claim 1, further comprising a plunger arrangement to dislodge a component of a fastener pair from a respective tool.

9. The assembly jig of claim 1, further comprising a plunger arrangement to separate each tool from the support surface.

10. The assembly jig of claim 1, further comprising a pair of boards resiliently held in a spaced relationship wherein one of the boards forms the support member.

11. The assembly jig of claim 10 wherein the pair of boards is resiliently held by one or more springs.

12. The assembly jig of claim 10, wherein one spring or other resilient member is provided corresponding to each tool.

13. The assembly jig of claim 10, further comprising one or more stops to counteract the resilient force and limit the spacing between the boards.

14. The assembly jig of claim 10, further comprising:

a plunger arrangement to dislodge a component of a fastener pair from a respective tool, wherein the plunger arrangement comprises a plunger arranged between the pair of boards, aligned with each tool position.

15. The assembly jig of claim 14 wherein:

the pair of boards includes a first board and a second board; and each tool has a through hole such that with a tool located by one or more alignment members, when the first and the second boards are brought together to reduce the space between them, the plunger dislodges a fastener component received in the tool.

16. The assembly jig of claim 10, wherein the pair of boards includes a first board and a second board, and further comprising:

a plunger arrangement to separate each tool from the support surface, wherein each plunger is fixed to a corresponding tool such that with a tool located by one or more alignment members, when the first and the second boards are brought together to reduce the space between them each plunger displaces a corresponding tool from the support surface.

17. The assembly jig of claim 1, wherein the one or more alignment members are fixed to the support surface.

18. The assembly jig of claim 8, wherein the one or more alignment members comprise the plunger arrangement.

19. The assembly jig of claim 1, configured to receive the items to be assembled such that the items are non-rotatable with respect to the support surface about an axis perpendicular to the support surface.

20. A method of assembling a planar structure comprising first and second assembly boards provided with holes or slots for securing the boards together using one or more threaded fastener pairs, the method comprising:

providing an assembly jig according to claim 1;

positioning the tool of the assembly jig using the one or more alignment members of the assembly jig;

inserting a first component of a fastener pair in the tool of the assembly jig;

positioning the first and second assembly boards over the assembly jig such that the holes or slots of the assembly boards are aligned with the tool;

positioning the second component of the fastener pair in alignment with the holes and the first component; and engaging a second tool engaged with the second fastener component and driving the second tool to rotate so that one of the first and second components rotates with respect to the other and is driven into the other as a result of their respective threads.

* * * * *